Sept. 9, 1952     A. P. BALZER ET AL     2,609,952
VEHICLE UNLOADING UNIT
Filed Oct. 18, 1948     3 Sheets-Sheet 3
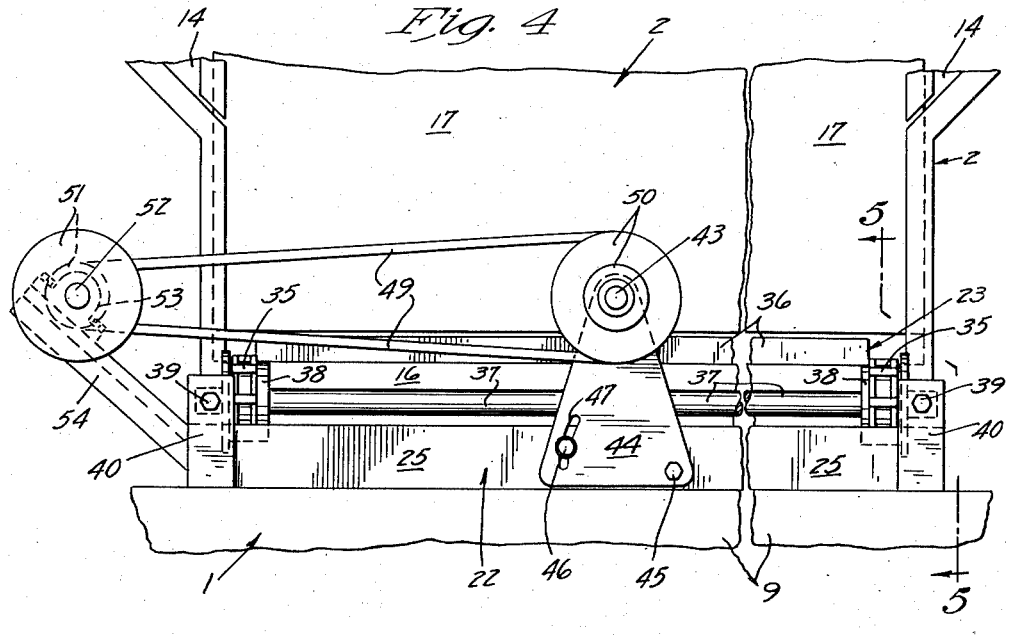
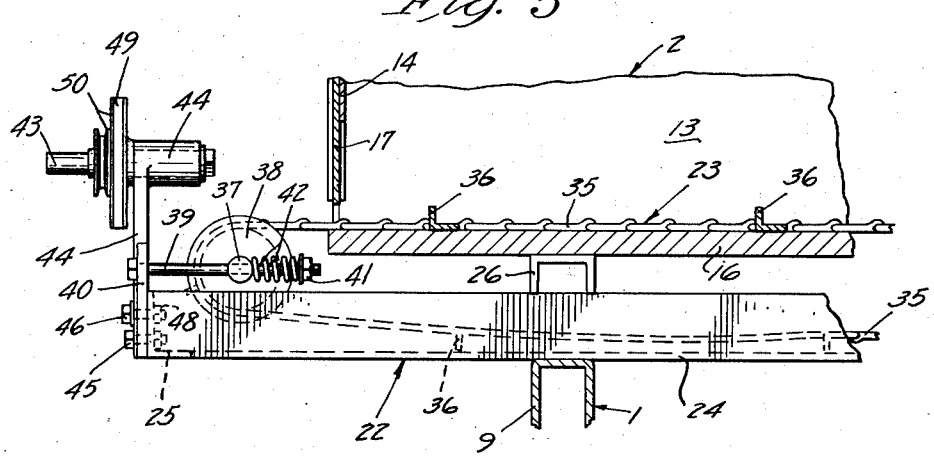
Inventors
Abram P. Balzer
John A. Stoesz
By their Attorneys
Merchant & Merchant Patented Sept. 9, 1952

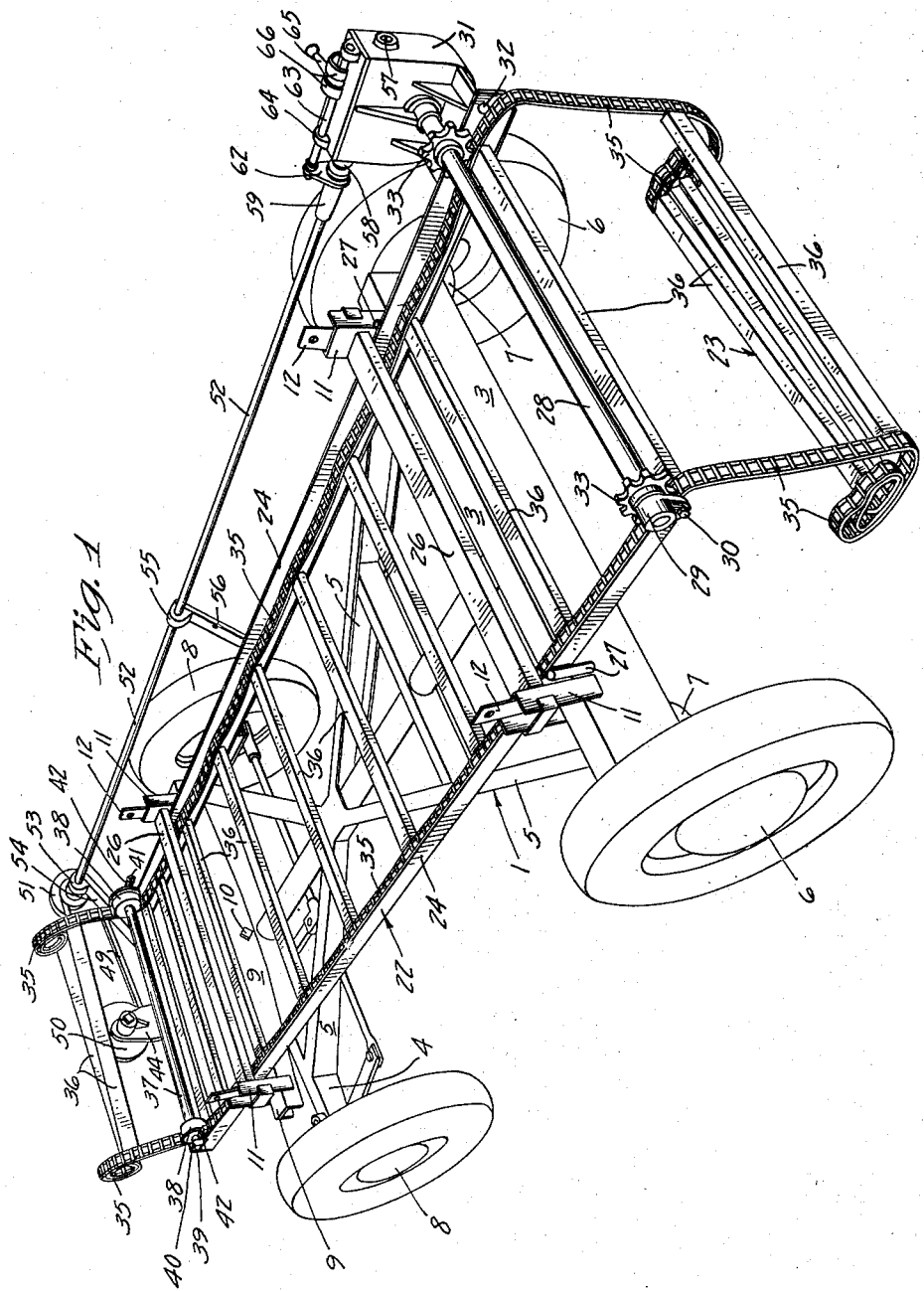

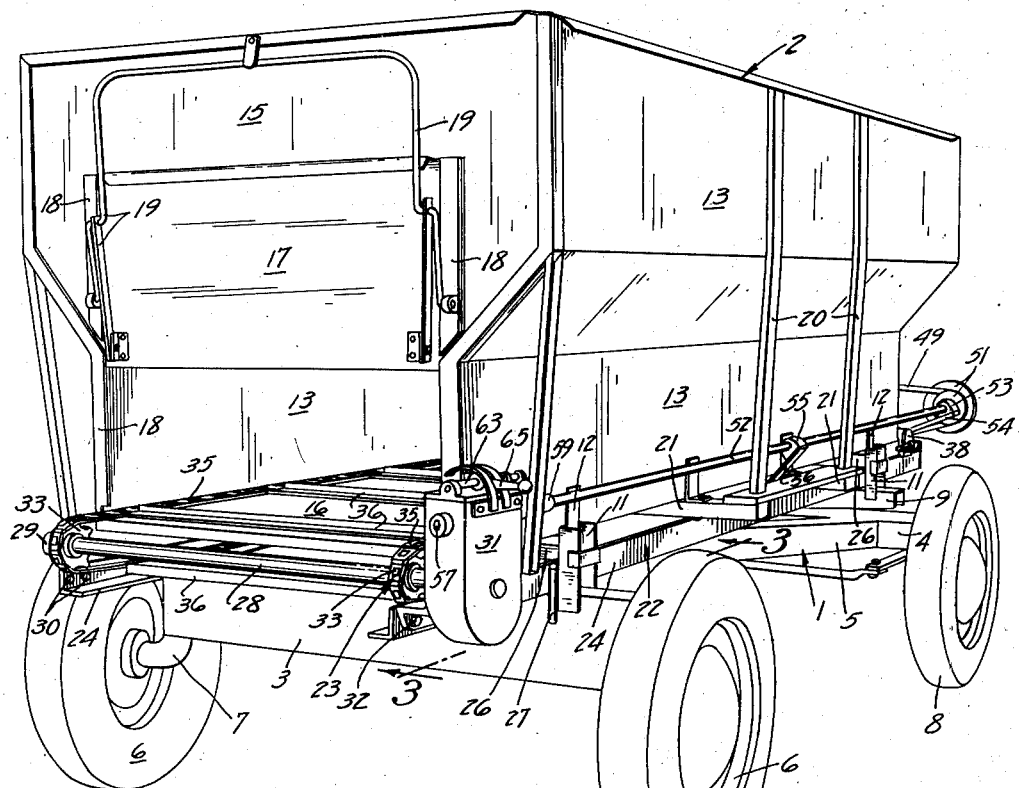

2,609,952

UNITED STATES PATENT OFFICE 2,609,952

VEHICLE UNLOADING UNIT

Abram P. Balzer and John A. Stoesz,
Mountain Lake, Minn.

Application October 18, 1948, Serial No. 55,036

1 Claim. (Cl. 214—83.36)

Our invention relates generally to mechanisms for unloading material from wagon boxes and, more specifically, to an unloading unit capable of being applied to any wagon or analogous vehicle having a wheel-mounted chassis and a material-carrying box removably secured thereto as an entirety.

The primary object of our invention is the provision of an unloading device which is largely self-contained and which may be attached to a wagon without the use of special tools or without requiring rebuilding of the wagon.

Another object of our invention is the provision of an unloading device as set forth having a conveyor adapted to be driven from the power take-off of a tractor or like vehicle to which the wagon may be coupled.

Still another object of our invention is the provision of an unloading device as set forth having means thereon for preventing longitudinal and lateral movements thereof with respect to the wheel-carried chassis upon which said unloading unit may be mounted.

Still another object of our invention is the provision of an unloading device as set forth, which is relatively inexpensive to manufacture, rugged in construction, and durable in use.

Still other highly important objects and advantages of our invention will become apparent from the following detailed specification, appended claim, and attached drawings.

Referring to the drawings, wherein like characters indicate like parts through the several views:

Fig. 1 is a view in perspective, as seen from the rear and left hand side, of a wheel-mounted chassis having our novel unloading unit supported thereon;

Fig. 2 is a view in perspective as seen from the rear and right hand sides of the structure of Fig. 1 with a wagon box mounted on the unloading unit;

Fig. 3 is a fragmentary view, partly in side elevation and partly in section, as seen from the line 3—3 of Fig. 2;

Fig. 4 is a fragmentary front elevation of the structure shown in Fig. 2; and

Fig. 5 is a view, partly in side elevation and partly in vertical section, taken substantially on the line 5—5 of Fig. 4.

Our invention provides an unloading unit which is particularly adapted for use on farm wagons and the like, which comprises wheel-mounted chassis having removable material-carrying wagon boxes mounted thereon. A wagon chassis of this type is usually adapted to support interchangeably a box for carrying materials, a flat platform, or a tank as when spraying growing plants and the like. However, as indicated, the unloading device is intended for use with a wagon box, whereby the contents thereof, such as granular material, ears of corn, or any bulk material, may be quickly discharged from the box. A wagon of this type is illustrated in the drawings as comprising a wheel-mounted chassis, indicated in its entirety by the numeral 1, and a wagon box 2. The chassis 1 is of conventional design having a rear axle-supporting beam 3 and a front axle 4 rigidly connected by an X-frame 5. Tire-equipped rear wheels 6 are journalled to axles 7 of the rear beam 3 and similar tire-equipped front wheels 8 are secured to the front axle 4 in a conventional manner so as to permit steering movements of the front wheels 8 with respect to the axle 4. A front beam 9 is secured to the intermediate portion of the axle 4 by means of a nut-equipped bolt 10 (see Fig. 1). The beams 3 and 9 are provided, adjacent their opposite ends, with upstanding cross-sectionally channel-shaped wagon box-retaining elements 11. The elements 11 are welded or otherwise rigidly secured to the beams 3 and 9 and are provided with upstanding tongues 12 to which the wagon box 2 is bolted.

The wagon box 2 comprises longitudinally-extending side walls 13, front and rear end walls 14 and 15 respectively, and a bottom 16. The end walls 14 and 15 are provided with sliding gates 17 which are slidably movable in guides 18. Sliding movements may be imparted to the gates 17 by means of conventional hand levers 19, one of which is shown (see Fig. 2). The wagon box 2 is braced at its intermediate portion by generally vertical brace members and horizontal beams 21 connected thereto.

Our novel unloading unit comprises a generally rectangular frame 22 and an endless conveyor 23. Frame 22 includes a pair of laterally-spaced parallel side frame members 24 connected at their extreme front ends by a transverse frame member 25 and intermediate their ends by longitudinally-spaced transverse wagon box-supporting members 26. Side frame members 24 and front frame member 25 are preferably made from structural angle iron, whereas the wagon box-supporting members are cross-sectionally channel-shaped; and the entire frame is welded together to form a relatively strong rigid structure. It will be noted that the wagon box-supporting members 26 rest upon and are secured to the upper edges of the side frame members 24 and are in spaced relation to the level of the bottom of the frame 22 for a purpose which will hereinafter become apparent. The frame 22 is adapted to rest upon the beams 3 and 9 of the chassis 1, the wagon box-supporting beams 26 being so spaced that they will lie between the wagon box-retaining elements 11 with the ends thereof abutting said member 11. Where variations in the distance between retaining elements 11 occur, wedges or shims not shown may be inserted between opposite ends of the beams 26 and said elements 11, whereby to prevent lateral movements of the frame 22 with respect to the chassis 1. We provide spaced pins 27 welded or otherwise secured to each of the side frame members 24 in longitudinally-spaced parallel relationship. Pins 27 are located adjacent opposite ends of the rear beam 26 and extend downwardly below the bottom level of the frame 22, whereby to lie one each on either side of the axle-supporting beam 3 (see Figs. 1, 2, and 3). The pins 27 are spaced apart sufficiently to freely permit the reception of the rear axle-supporting beam 3 therebetween but limit longitudinal movements of the frame 22 with respect to the chassis 1. In the event that the beam 3 is very narrow, suitable wedges or shims not shown may be applied therebetween and the pins 27.

A rotary shaft 28 extends transversely of the frame 22 adjacent its rear end and is journalled at one end in a bearing 29 bolted or otherwise secured to one of the side frame members 24, as indicated at 30. At its opposite end, the shaft 28 is journalled in a gear box 31 which is bolted to the opposite side frame member 24 as at 32. A pair of laterally-spaced sprocket wheels 33 are rigidly secured to the shaft 28, one each adjacent one of the side frame members 24, and are adapted to drive the endless conveyor 23, which conveyor comprises a pair of laterally-spaced flexible link chains 35 and longitudinally-spaced transverse connecting flights 36. The flights 36 are welded or otherwise secured at their opposite ends to links of the chain 35 and are L-shaped in cross section (see particularly Fig. 5). The spaced chains 35 have meshing engagement, one each with one of the sprockets 33.

At the front end of the frame 22 is a transverse shaft 37. Journalled on the shaft 37 are spaced idler rollers 38 over which the conveyor 23 is adapted to run. The shaft 37 is supported at its opposite ends by stud bolts 39 which extend longitudinally rearwardly of the front end of the frame 22 through a pair of upstanding lugs 40 welded or otherwise secured at the front corner of the frame 22. As seen, particularly with reference to Fig. 5, the stud bolts pass through apertures in the opposite ends of the shaft 37 and are equipped at their outer threaded ends with washer-equipped nuts 41. Interposed between the end portions of the shaft 37 and the washer-equipped nuts 41 are coil compression springs 42 which bias the shafts 37 toward the front end of the frame 22.

Rotary movement is imparted to the shaft 28 by connections now to be described. A stub shaft 43 is journalled in a bearing bracket 44 which is pivotally mounted to the front frame member 25 as indicated at 45. A washer-equipped locking bolt 46 passes through an arcuate slot 47 in the bearing bracket 44 and through the front frame member 25 and is provided with a nut 48, whereby the bracket 44 may be clamped in any desired position on the front frame member 25. The stub shaft 43 is adapted to be coupled to the power take-off of a tractor or other vehicle not shown which may be used to pull the wagon. A flexible belt 49, preferably of the V-type, runs over one of a pair of V-grooved pulleys 50 fast on the stub shaft 43 and over the corresponding one of another pair of V-grooved pulleys 51 fast on a shaft 52. The shaft 52 extends longitudinally of the frame 22 in laterally outwardly-spaced relation thereto and is journalled at its front end portion in a bearing 53 secured to an angularly-disposed arm 54 fast on one of the side frame members 24. Shaft 52 is journalled in and supported intermediate its ends by a bearing 55 fast on an angularly-disposed supporting arm 56 rigidly secured by welding or the like to the intermediate portion of said one of said side frame members 24. Referring to Fig. 3, it will be seen that the rear end of the shaft 52 is axially aligned with another shaft 57 which is journalled in the gear box 31 and which is provided with a jaw clutch element 58. A mating jaw clutch element 59 is journalled on the outer end of shaft 52 and mounted for sliding movements by means of pin and slot connections 60 to the rear end of shaft 52. The jaw clutch element 59 is provided with a peripheral channel 61 which receives a shifter fork 62. The shifter fork 62 is carried by a slide rod 63 slidably mounted in brackets 64 on the top of the gear box 31. A shifter handle 65 is secured to the shifter rod 63 for rotary movements thereabout but slidable therewith and is adapted to be manipulated into and out of a channel formed by a pair of arcuate stop members 66 for manually moving the shifter fork 62 and jaw clutch member 59 axially of the shafts 52 and 67, whereby to couple or uncouple shafts 57 and 52 for common rotary movement. Shaft 57 is operatively connected to transverse shaft 28 through gears not shown but contained within the gear box 31.

When our unloading unit is to be installed in a wagon, wagon box 2 is removed from the chassis 1 and the unloading unit is then laid over the beams 3 and 9 between the wagon box-retaining elements 11 and with opposite pairs of pins 27 straddling the beam 3. The conveyor 23, which is provided with suitable means for disconnection, is then placed in the condition illustrated in Fig. 1 with the chains 35 of the lower run thereof resting upon the horizontally-disposed portions of the side frame members 24. The wagon box 2 is then placed in position on the supporting members 26 and bolted to the upstanding tongues 12. Opposite ends of the conveyor 23 are then fed through the gate openings at opposite ends of the wagon box 2 and coupled together within the wagon box. The sprocket wheels 33 and idler rollers 38 are of such a diameter and the elevation thereof with respect to the frame 22 is such that the lower or return run of the conveyor 23 passes between the bottom level of the frame 22 and the wagon box-supporting members 26 and the upper or delivery run of the conveyor 23 rides on the bottom 16 of the wagon box 2. It will be observed that, when opposite ends of the conveyor 23 are to be coupled together, the nuts 41 are loosened on the stud bolt 39 to provide sufficient slack in the chains 35 to allow the ends thereof to be easily connected. Thereafter, the nuts 41 are tightened against the springs 42 until proper tension is placed on the conveyor 23.

Obviously, when material is to be transported in the wagon, the gates 17 at the front and rear of the wagon box 2 are closed as far as permitted by the contact thereof with the link chains 35.

Then, when it is desired to unload material from the wagon box 2, it is but necessary to raise the gates 17 at the front end of the wagon box 2 sufficiently to allow the flights 36 to pass thereunder. The gate 17 at the rear of the wagon box 2 may be opened as much as is necessary to allow free passage of the material therebetween and the bottom 16. The shaft 28 is then caused to rotate in a direction to move the upper or delivery run of the conveyor 23 from the front toward the back of the wagon box 2. With this arrangement, we have found that a wagon load of material may be quickly and easily displaced from the wagon box 2, thereby effecting a substantial savings in time and manual effort.

The speed at which the conveyor 23 operates is determined by the disposition of the V-belt 49 on the pulleys 50 and 51. As illustrated in Figs. 1 and 4, belt 49 runs over the large pulley 50 and the small pulley 51 so as to drive the conveyor 23 at a relatively high speed. For driving the conveyor 23 at a relatively low speed, the belt 49 will be positioned to run over the smaller pulley 50 and the large pulley 51. Tension on the belt 49 is maintained by adjustment of the bracket 44 about the axis of the pivot bolt 45.

Our invention has been thoroughly tested and found to be adequate for the accomplishment of the objects set forth; and, while we have shown a preferred embodiment of our device, it will be understood that the same is capable of modification without departure from the spirit and scope of the invention as defined in the claim.

What we claim is:

In a device of the class described, a unitary structure comprising a rectangular frame adapted to rest upon and be supported by the transverse front and rear axle-supporting beams of a wheel-supported chassis, a pair of longitudinally-spaced transverse wagon box-supporting members secured to said frame intermediate the ends thereof, said members being located above the level of the bottom of said frame, a rotary driving shaft extending transversely of said frame at one end portion thereof, an idler shaft extending transversely of said frame at the opposite portion thereof, an endless conveyor running over said shafts and driven by said driving shaft, said conveyor having delivery and return runs one of which passes over said supporting members and the other of which passes between said supporting members and the bottom of said frame, and means for preventing longitudinal movement of said frame with respect to said chassis and a wagon box supported on said members, said means including longitudinally-spaced cooperating pairs of stop elements adapted to straddle said beams, upstanding tongues associated with opposite ends of said members and adapted to be secured to said wagon box and abutments on opposite sides of said frame permitting vertical movements of said depending stop elements therebetween but limiting movements thereof longitudinally of said frame.

ABRAM P. BALZER.
JOHN A. STOESZ.

REFERENCES CITED

The following references are of record in the file of this patent:

UNITED STATES PATENTS

| Number | Name | Date |
| --- | --- | --- |
| 1,081,697 | Renney et al. | Dec. 16, 1913 |
| 1,403,307 | Fisher | Jan. 10, 1922 |
| 2,345,328 | Conway et al. | Mar. 28, 1944 |
| 2,434,718 | Recker | Jan. 20, 1948 |
| 2,462,404 | Kahres et al. | Feb. 22, 1949 |
| 2,478,583 | Hybbert | Aug. 9, 1949 |
| 2,496,305 | Ortmeier | Feb. 7, 1950 |